Figure 1:
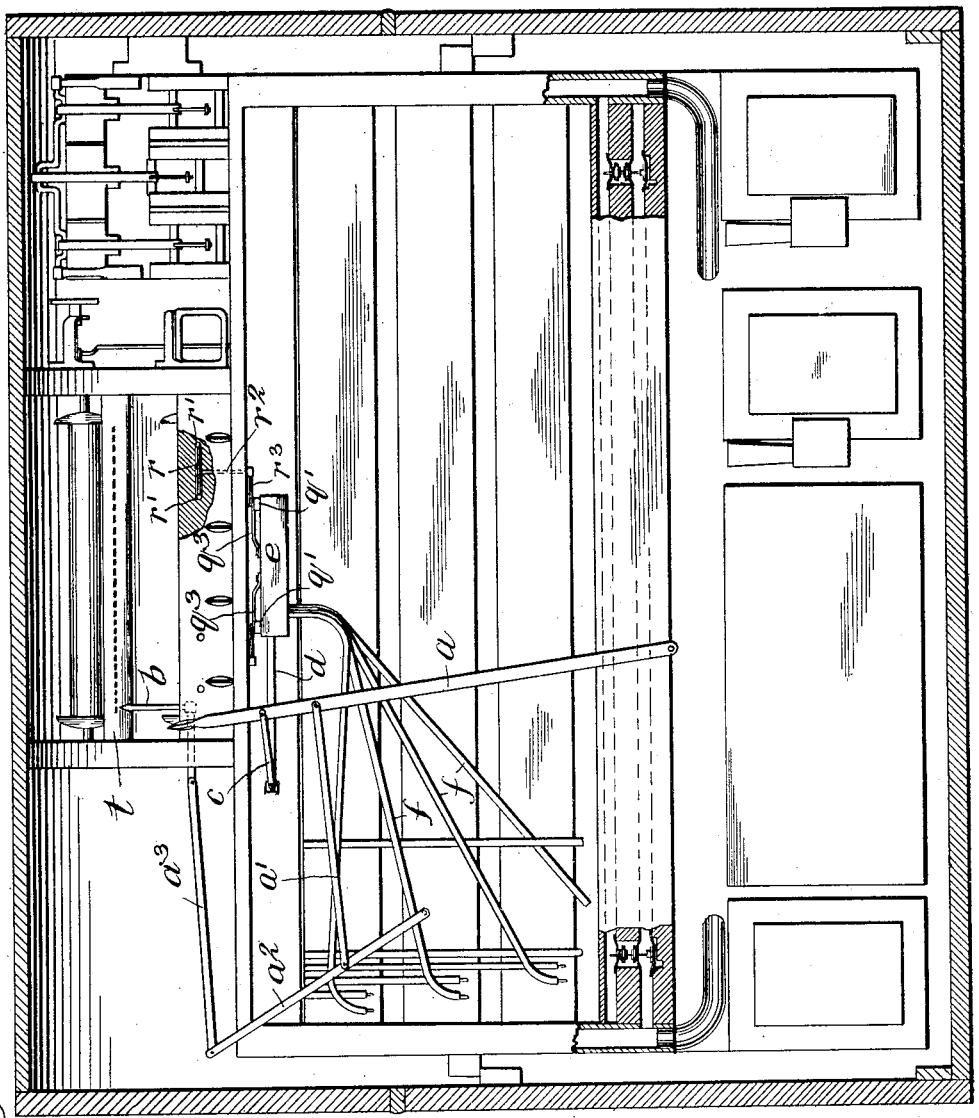

No. 743,065. PATENTED NOV. 3, 1903.
J. H. DICKINSON.
MECHANISM FOR ACCENTUATING ONE OR MORE NOTES IN
MECHANICALLY ACTUATED MUSICAL APPARATUS.
APPLICATION FILED MAY 13, 1903.
NO MODEL. 3 SHEETS—SHEET 1.

WITNESSES:
Geo. L. Wheelock
A. L. O'Brien

INVENTOR
Joseph H. Dickinson
BY
Dickerson Brown
Raegener & Binney
ATTORNEYS

No. 743,065. PATENTED NOV. 3, 1903.
J. H. DICKINSON.
MECHANISM FOR ACCENTUATING ONE OR MORE NOTES IN
MECHANICALLY ACTUATED MUSICAL APPARATUS.
APPLICATION FILED MAY 13, 1903.
NO MODEL. 3 SHEETS—SHEET 2.
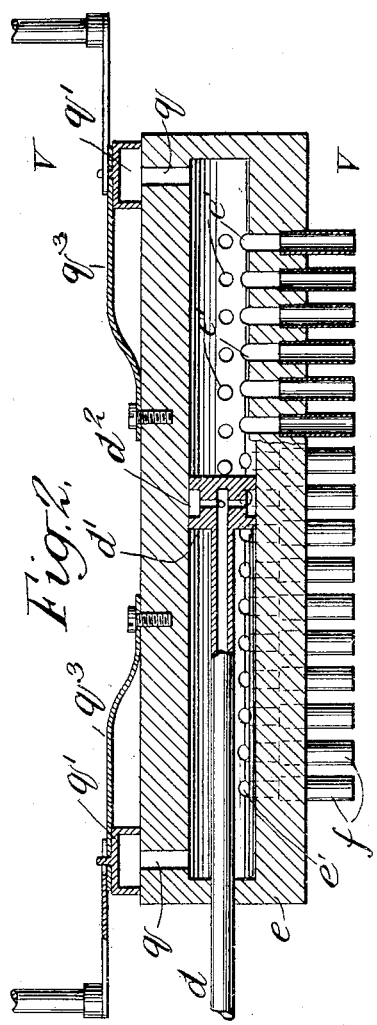
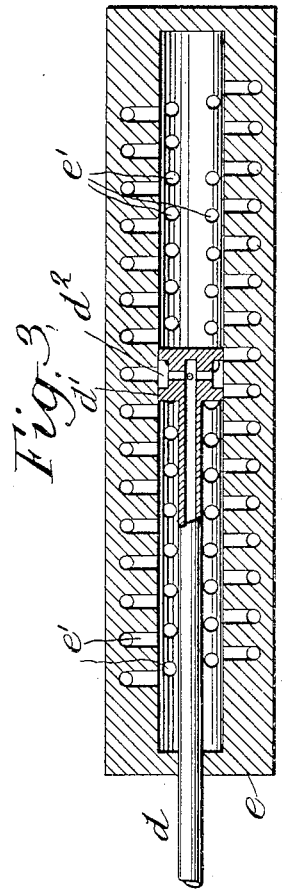
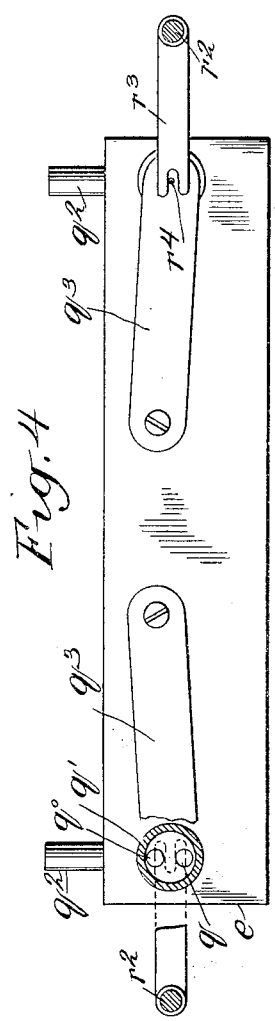
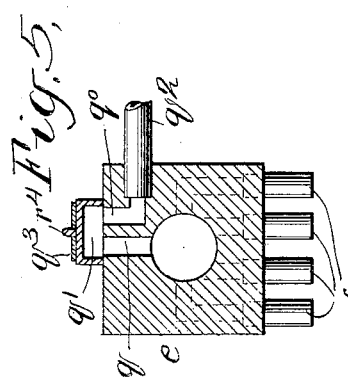

No. 743,065. PATENTED NOV. 3, 1903.
J. H. DICKINSON.
MECHANISM FOR ACCENTUATING ONE OR MORE NOTES IN
MECHANICALLY ACTUATED MUSICAL APPARATUS.
APPLICATION FILED MAY 13, 1903.
NO MODEL. 3 SHEETS—SHEET 3.
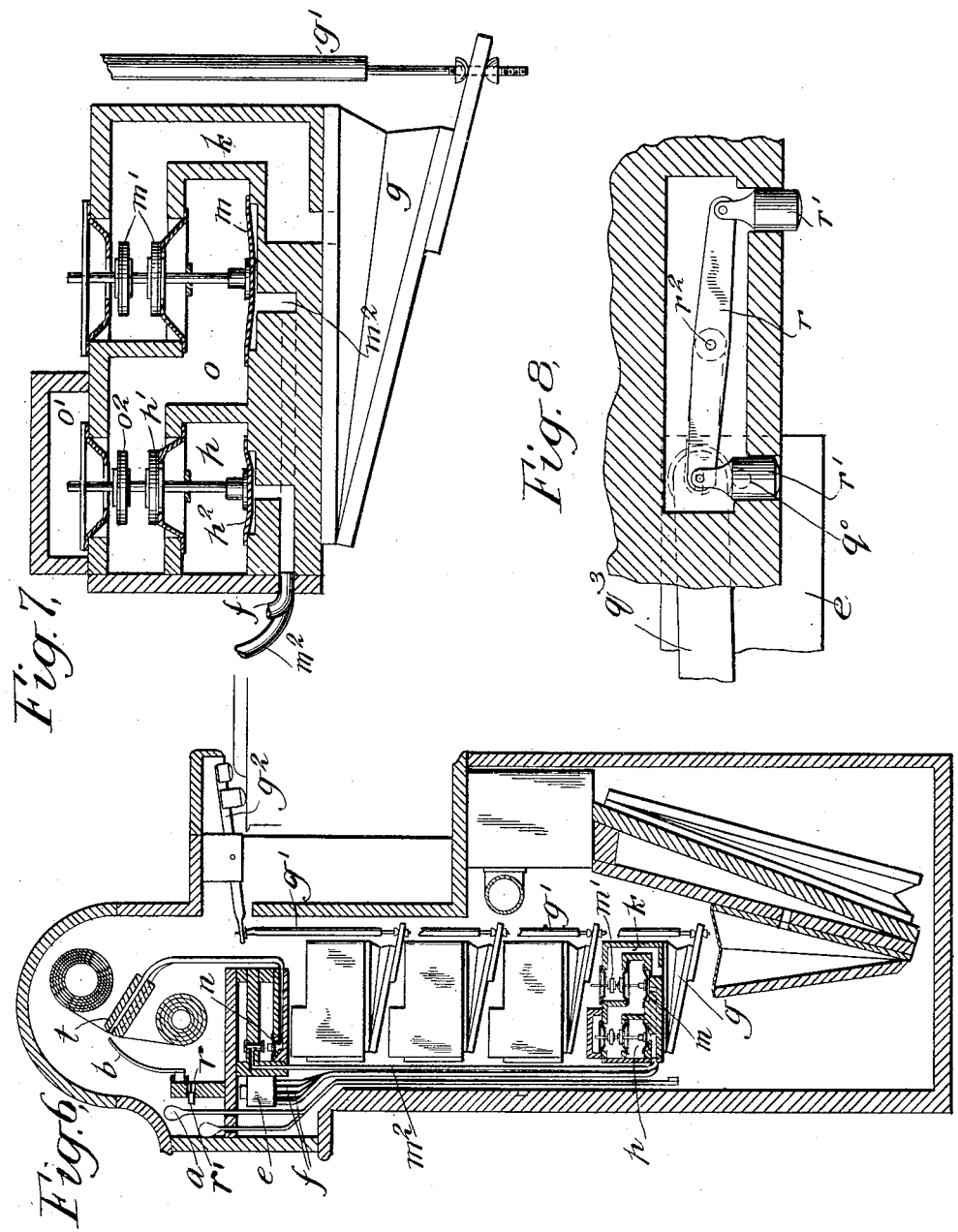
WITNESSES:
Geo. L. Wheelock
A. E. O'Brien
INVENTOR
Joseph H. Dickinson
BY
Dickerson Brown
Raegener & Binney
ATTORNEYS No. 743,065.                                          Patented November 3, 1903.

UNITED STATES PATENT OFFICE.

JOSEPH H. DICKINSON, OF GARWOOD, NEW JERSEY, ASSIGNOR TO THE AEOLIAN COMPANY, OF NEW YORK, N. Y., A CORPORATION OF CONNECTICUT.

MECHANISM FOR ACCENTUATING ONE OR MORE NOTES IN MECHANICALLY-ACTUATED MUSICAL APPARATUS.

SPECIFICATION forming part of Letters Patent No. 743,065, dated November 3, 1903.

Application filed May 13, 1903.  Serial No. 156,980.  (No model.)

*To all whom it may concern:*

Be it known that I, JOSEPH H. DICKINSON, a resident of Garwood, State of New Jersey, (post-office address, Aeolian Hall, 362 Fifth avenue, New York city,) have invented certain new and useful Improvements in Mechanism for Accentuating One or More Notes in Mechanically-Actuated Musical Apparatus, of which invention the following is a specification, accompanied by drawings, which illustrate certain preferred forms thereof.

The object of the invention is the accentuation of single notes or of ranges of notes in instruments for playing pianos and other musical instruments or in mechanism incorporated in or forming parts of pianos or other musical instruments for playing them.

The invention is described and illustrated in the drawings as being applied to certain known and used forms of mechanism, and the improvements constituting the present invention are enumerated in the claims.

In the accompanying three sheets of drawings, Figure 1 is a front elevation of a pianola to which the invention is shown as applied, the front of the case being removed and some parts shown in section to illustrate the most improved though not the simplest form or modification of the invention. Figs. 2, 3, 4, and 5 are detail views of the sliding valve and its connections, respectively, in vertical section, horizontal section, plan view, and transverse section on the line V V, Fig. 2. Fig. 6 is a front-to-rear section of the apparatus; and Figs. 7 and 8 illustrate details of the pneumatics and valves and of the controlling-buttons and their connections, respectively.

It is old and well known in many forms of musical apparatus to operate the striking-levers or music-playing mechanism by means of a perforated sheet of paper which travels over the tracker-board. It is equally well known in many forms of musical apparatus to control primary pneumatics by such a tracker-board and its connections and to cause the primary pneumatics to operate secondary pneumatics, which in turn control the pneumatically-operated mechanism for effectuating the playing. It is also old and well known to provide levers and connections for varying the wind-pressure or wind-suction, so as to modify the musical expression and to cause forte and piano effects. Devices both automatic and non-automatic have been invented or suggested for suddenly increasing or decreasing the pressure that is applied to operate certain notes. It is also old and well known to have two or more different reservoirs or sources of differing pressures or tensions for operating various parts of pianolas and other mechanically-played instruments.

In the drawings I have selected for illustration of the old parts to which the invention is applicable a well-known form of instrument, and it is not, therefore, necessary to describe in detail the old and well-known parts thereof.

The essence of the present invention consists in providing or applying to certain old parts a means for accentuating any one note or a few notes without simultaneously affecting adjacent notes or connections materially, the form best adapted for carrying out the invention being that of a slide-valve suitably connected with the operating-air and guided within a suitable case or chamber having ports corresponding with the notes, which ports are connected with suitable devices for the purpose of accenting at will in the manner stated. Another part of the invention enables the operator to accentuate at will a series of notes above or below any note, or, in other words, above or below the valve referred to, by connecting either end of said chamber or case with the actuating-air.

In the preferred way of carrying out the invention the pneumatic mechanism for playing each note is provided with the usual source of operating-wind and the usual means for varying the expression. In addition thereto it is provided with a high-tension connection and devices whereby increased force may be applied to the pneumatic and such note when it is operated by the tracker-board and pneumatic-valves, each individual note having preferably such high-tension device separate and independent of all the other notes. Although as it is not usual to simultaneously accentuate two notes that differ by only one semitone, it is probably not necessary that the invention should be separately applied to single-note mechanisms only.

The following is the embodiment of one form of which the new invention is capable.

Referring to Figs. 1 and 6, there is arranged an operating-lever $a$, having a motion shorter than the length of the tracker-board $t$. The said accentuating hand-lever $a$ is connected by a link $a'$ with secondary lever $a^2$ and this in turn by a link $a^3$ with an index $b$. It will be seen that the motion of the lever $a$ is only about one-third of the motion of the index $b$. The index sets opposite the tracker-holes for the purpose of indicating which note is to be accented. The operating-lever $a$ is further connected, by means of a link $c$, with a piston-rod $d$, which carries a piston $d'$, forming a slide-valve. The piston-rod $d$ is tubular or hollow and freely admits air at one end to the piston or valve $d'$. This valve $d'$ is guided in a cylinder-like case or chamber $e$, having ports $e'$, one for each of the notes, which ports are arranged at such close intervals that an annular groove or recess $d^2$ in the piston or valve may communicate with three or four ports $e'$ at the same time. This is because by the communication of the four ports at one time the accenting-lever $a$ need not be adjusted as accurately as though it were necessary to place the valve to more accurately cover only a single port $e'$. There is no objection to opening four ports at once, because it is immaterial that all notes that happen to be played simultaneously and which do not differ by more than three semitones are accented. If desired, however, of course the valve may be constructed to open only a single port. This will require a little more delicate mechanism. The ports $e'$ communicate with pipes $f$, a few of which are shown in Fig. 1, and these in turn lead to accenting-pneumatics, as shown more clearly in Fig. 7, which serve to connect the controlling-pneumatic for each striker-bellows with a source of high tension instead of with the low tension as modified or tempered to produce piano or pianissimo effects or other effects of expression.

Referring to Fig. 7, $g$ indicates the bellows-pneumatic, which by means of a rod $g'$ connects with the striker $g^2$. From the bellows-pneumatic $g$ a passage $k$ leads, which is connected, as usual, with either the atmosphere or tempered wind, as will be clear, by the movement of a pneumatic $m$ and valves $m'$, which are usually and preferably secondary pneumatic-valves, the pneumatic $m$ of which is operated through a passage $m^2$ from the primary pneumatics, which are in turn actuated from the tracker-board in the usual way. The primary pneumatics are shown at $n$, one for each passage $m^2$. A chamber $o$ communicates with a low-pressure wind-chamber $o'$, there being arranged a pneumatically-actuated valve $o^2$, which cuts off the low tension when actuating-air is admitted through one of the ports $e'$ and its pipe or tube $f$. The chamber $p$ for high wind is arranged under the chamber $o'$ and communicates with the chamber $o$ through the medium of the valves $p'$. When, therefore, the movement of the controlling slide-valve $d'$ opens a port $e'$ and admits air to a pipe $f$, the corresponding pneumatic $p^2$, which controls the valves $p'$ $o^2$, operates to open the valve $p'$ and close the valve $o^2$ to the low tension, thereby connecting the chamber $o$ with the untempered or high wind chamber $p$. The described means for obtaining in the bellows-pneumatic $g$ either a low tension or high tension for the purposes of expression are compact and simple and readily work in accord one with the other.

For the purpose of connecting all the ports $e'$ either above or below the piston-valve $d'$ with atmosphere or with suction at will, and thereby causing them to accentuate at will all the notes above or all the notes below the valve $d'$, the following provisions are made: Each end of the valve chamber or case $e$ has a single opening $q$ communicating directly with the chamber of a movable cap $q'$, which covers and is therefore in communication with an opening $q^0$, which receives the end of a suction-pipe $q^2$. Each cap $q'$ constitutes a valve, which is pressed downward and also guided in its movements by the pivoted spring-arm $q^3$. In the position shown in Figs. 2, 4, and 5 the cap-valves $q'$ connect the two ends of the valve-chamber $e$ with suction, and therefore only those notes will be accentuated whose ports $e'$ connect with the annular opening or recess $d^2$ of the valve and receive atmospheric pressure. In the construction shown in Fig. 8 the arm $q^3$ and the valve-cap $q'$ are shown moved backward, so as to uncover the port $q$, which opens into the right-hand or treble end of the casing $e$, and therefore admits the atmospheric pressure to all the ports $e'$ that are above or on the treble side of the slide-valve $d'$. Of course a similar movement of the corresponding valve $q'$ at the base end would admit air at that end, and therefore accentuate all the notes below those accented by the slide-valve $d'$.

A convenient control of the valve $q'$ by the person playing the instrument is accomplished by two hidden levers $r$, located within one of the front boards of the instrument, as seen from Figs. 1, 6, and 8. Each lever is controlled by two buttons $r'$. Each lever $r$ is mounted on a vertical rock-shaft $r^2$, which carries at its lower end an arm $r^3$, engaging a pin $r^4$ in the top of the cap $q'$. Consequently upon pressing the outermost button $r'$ of either lever $r$ the arm $r^3$ is moved toward the front of the machine and connects the corresponding end of the casing $e$ with suction, whereas when the inner button is pressed the arm $r^3$ is moved toward the rear of the machine and opens the corresponding end of the casing e to the atmosphere to accentuate all of the notes at that end.

In the form of the invention shown in the drawings the slide-valve and all of its connections are arranged beneath the trackerboard and the music-rolls, so as to be out of sight.

The invention has been described in connection with manual means for accenting any note, because the invention is simpler and more readily understood in its manual form than when automatic devices are used independently of the operator. The invention as claimed, however, is not intended to be limited to manual operation.

In the broader aspect of the invention it is not intended to be limited to any of the forms of mechanism or details illustrated, and, moreover, the specific forms of parts of the invention illustrated and described may obviously be used without other parts of the invention shown and described.

Having thus described the invention and without limiting myself to its details, the following is claimed as new:

1. In musical apparatus the combination of operating-pneumatics and connections for the respective notes, and means, comprising a chamber or case provided with ports for the notes and a suitably-actuated slide-valve guided in the chamber and open to a source of operating-wind, for accentuating at will any note or a series of notes without simultaneously affecting adjacent connections, for substantially the purposes set forth.

2. In musical apparatus, the combination of operating-pneumatics and connections for the respective notes and means, comprising a chamber or case provided with ports for the notes and a suitably-actuated slide-valve guided in the chamber and open to a source of operating-wind, for increasing the pneumatic force for any one of the said pneumatics at will, for substantially the purposes set forth.

3. In musical apparatus, the combination of operating-pneumatics and connections for the respective notes and means, comprising a chamber or case provided with ports for the notes and a suitably-actuated slide-valve guided in the chamber and open to a source of operating-wind, for increasing the pneumatic force for any one of the said pneumatics at will, and means for indicating the note affected, for substantially the purposes set forth.

4. In musical apparatus, the combination of operating-pneumatics and connections for the respective notes and means, comprising a chamber or case provided with ports for the notes and a suitably-actuated slide-valve guided in the chamber and open to a source of operating-wind, for increasing the pneumatic force for any one of the said pneumatics at will, and adjustable means for similarly affecting neighboring pneumatics at will, for substantially the purposes set forth.

5. In musical apparatus, the combination with the operating-pneumatics and their connections for the several notes, and passages for admitting higher wind tension or pressure to the notes severally, pneumatically-operated valves for the said several passages, and controlling means therefor, comprising a chamber or case provided with ports for the notes and a suitably-actuated slide-valve guided in the chamber and open to a source of operating-wind, said slide-valve being controlled by hand for opening and closing the ports for said passages, for substantially the purposes set forth.

6. In musical apparatus, the combination with the operating-pneumatics and their connections for the several notes, of passages for admitting higher wind tension or pressure to the notes severally, pneumatically-operated valves for the said several passages, a chamber or case having ports and suitable connections for controlling said passages, and a slide-valve guided in the said chamber or case for controlling the said ports for opening and closing any of the said pneumatically-operated valves, for substantially the purposes set forth.

7. In musical apparatus, the combination with operating-pneumatics for playing the several notes, and pneumatic-valves for controlling the said operating-pneumatics, of auxiliary accenting-valves and passages for admitting higher wind force to the operating-pneumatics, said accenting-valves and said pneumatic-valves both controlling the admission of the higher wind to an operating-pneumatic, and pneumatic means, comprising a chamber or case provided with ports for the notes and a suitably-actuated slide-valve guided in the chamber and open to a source of operating-wind, for operating the said accenting-valves for the notes severally, for substantially the purposes set forth.

8. In musical apparatus, the combination with operating-pneumatics for playing the several notes, and pneumatic-valves for controlling the said operating-pneumatics, of auxiliary accenting-valves and passages for admitting higher wind force to the operating-pneumatics, said accenting-valves and said pneumatic-valves both controlling the admission of the higher wind to an operating-pneumatic, and pneumatic means, comprising a chamber or case provided with ports for the notes and a suitably-actuated slide-valve guided in the chamber and open to a source of operating-wind, for operating the said accenting-valves for the notes severally, and also for a range of notes above or below any given note, for substantially the purposes set forth.

9. In musical apparatus, the combination with operating-pneumatics for playing the several notes, and pneumatic-valves for controlling the said operating-pneumatics, and auxiliary accenting-valves and passages for admitting higher wind force to the operating-pneumatics, said accenting-valves and said pneumatic-valves both controlling the admission of the higher wind to an operating-pneumatic, pneumatic means comprising a chamber or case provided with a series of ports or mouths for operating the said accenting-valves, and a slide-valve guided in the said chamber or case and open to a source of operating-wind, for opening and closing the said ports or mouths to accent any given note, for substantially the purposes set forth.

10. In musical apparatus, the combination with operating-pneumatics for playing the several notes, and pneumatic-valves for controlling the said operating-pneumatics, and auxiliary accenting-valves and passages for admitting higher wind force to the operating-pneumatics, said accenting-valves and said pneumatic-valves both controlling the admission of the higher wind to an operating-pneumatic, pneumatic means comprising a chamber or case provided with a series of ports or mouths for operating the said accenting-valves, and a slide-valve guided in the said chamber or case and open to a source of operating-wind, for opening and closing the said ports or mouths to accent any given note, and connections and valves for accenting also a series of notes above or below the said given note, for substantially the purposes set forth.

11. In musical apparatus, the combination of operating-pneumatics and connections for the respective notes, a chamber or case provided with ports corresponding with the respective notes, a slide-valve guided in the chamber or case and open to a source of operating-wind for controlling said ports, means governed by said ports for accentuating at will any note, said chamber or case being provided with auxiliary ports at opposite ends of said slide-valve, and valves for controlling said auxiliary ports, for substantially the purposes set forth.

12. In musical apparatus, the combination of operating-pneumatics and connections for the respective notes, a chamber or case provided with ports corresponding with the respective notes, a slide-valve guided in the chamber or case and open to a source of operating-wind for controlling said ports, means governed by said ports for accentuating at will any note, said chamber or case being provided with auxiliary ports at opposite ends of said slide-valve, and manually and separately actuated valves for controlling said auxiliary ports, for substantially the purposes set forth.

13. In musical apparatus, the combination of operating-pneumatics and connections for the respective notes, a chamber or case provided with ports corresponding with the respective notes, a slide-valve guided in the chamber or case and open to a source of operating-wind for controlling said ports, means governed by said ports for accentuating at will any note, said chamber or case being provided with auxiliary ports at opposite ends of said slide-valve, valves for controlling said auxiliary ports, and separate operating devices for the valves for the auxiliary ports, for substantially the purposes set forth.

14. In musical apparatus, the combination of operating-pneumatics and connections for the respective notes, a chamber or case provided with ports corresponding with the respective notes, a slide-valve guided in the chamber or case and open to a source of operating-wind for controlling said ports, means governed by said ports for accentuating at will any note, said chamber or case being provided with auxiliary ports at opposite ends of said slide-valve, valves for controlling said auxiliary ports, treble and base push-buttons and connections leading therefrom to the respective valves for opening or closing the said auxiliary ports, for substantially the purposes set forth.

In testimony whereof I have signed this specification in the presence of two subscribing witnesses.

JOSEPH H. DICKINSON.

Witnesses:
E. VAN ZANDT,
GEO. L. WHEELOCK.